Dec. 28, 1954     J. O. HICE ET AL     2,698,098
SEAFOOD PINNING APPARATUS
Filed Feb. 23, 1951     3 Sheets-Sheet 1
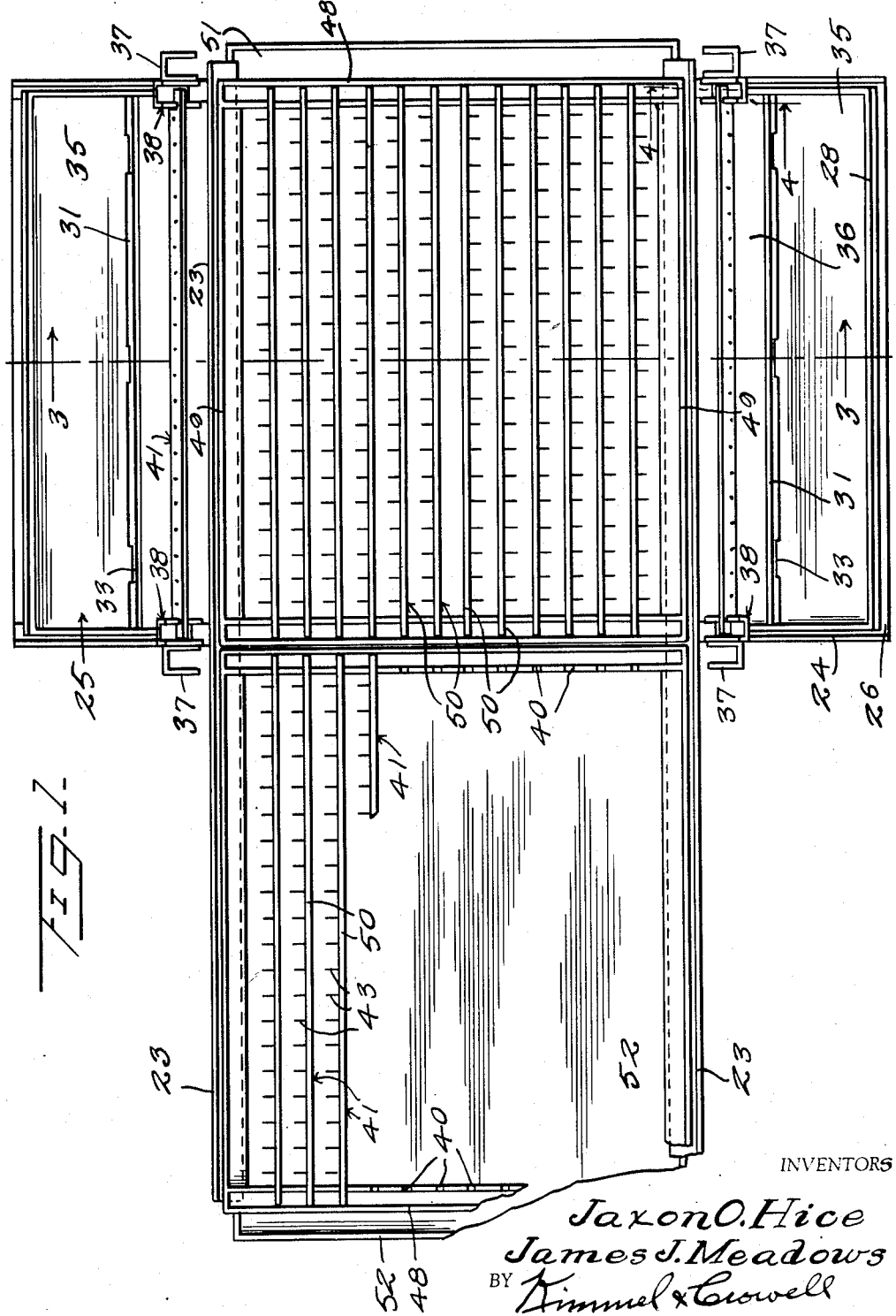
INVENTORS
Jaxon O. Hice
James J. Meadows
BY Kimmel & Crowell
ATTORNEYS

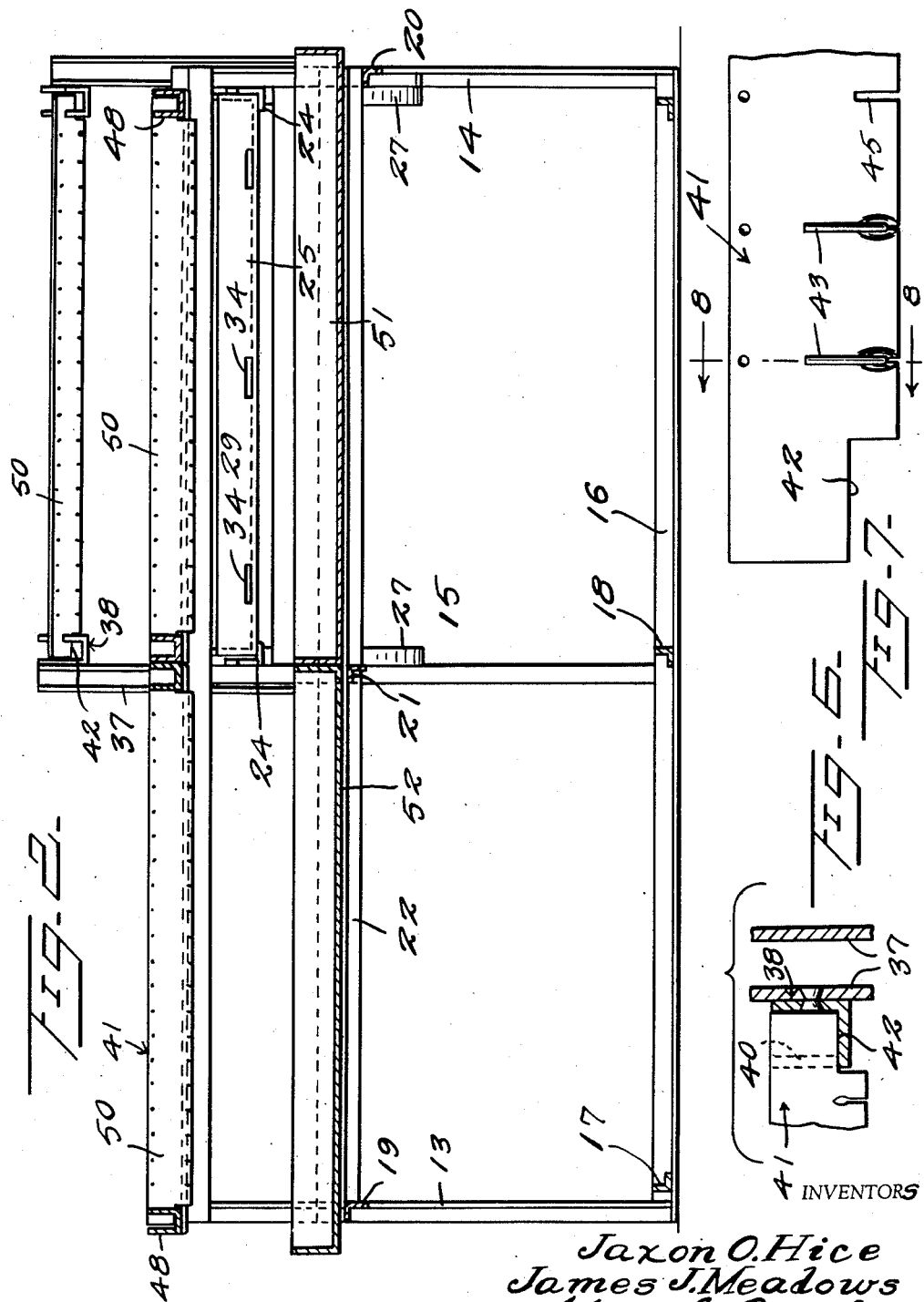

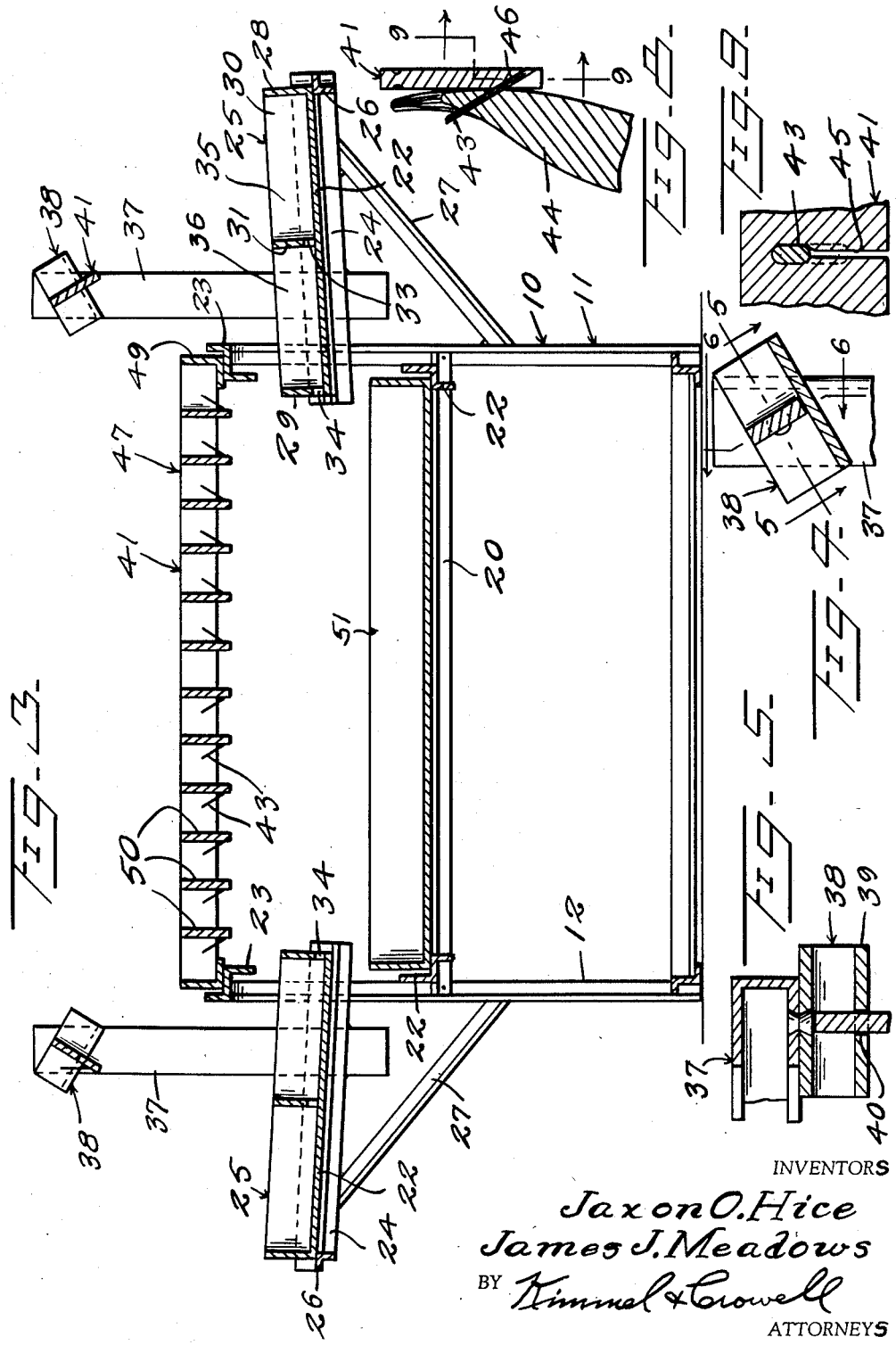

United States Patent Office 2,698,098
Patented Dec. 28, 1954

2,698,098

SEAFOOD PINNING APPARATUS

Jaxon Odell Hice and James John Meadows, St. Simons Island, Ga., assignors to Seapak Corporation, St. Simons Island, Ga.

Original application February 23, 1951, Serial No. 212,271. Divided and this application February 23, 1951, Serial No. 212,272

2 Claims. (Cl. 214—1)

This invention relates to pinning apparatus for use in preparing seafood for quick freezing and is a division of our copending application Serial Number 212,271, filed February 23, 1951 for Method and Apparatus for Preparing, Freezing and Packing Frozen Shrimp.

An object of this invention is to provide apparatus whereby the shrimp may be suspended in spaced relation one to another so that the subsequent steps of coating with batter, and meal, and the freezing of the coated shrimp may be accomplished with a minimum of handling and within a minimum time, so that the palatable fresh characteristic will be retained.

Another object of this invention is to provide an improved frame structure for supporting the pinning bars at the time the shrimp or other seafood are impaled, the frame structure also having provision for holding pin bar racks within which the pin bars are placed and the bars accumulated.

A further object of this invention is to provide an improved pin bar and rack structure which will hold a substantial number of shrimp in suspended relation with the shrimp spaced one from the other so that each shrimp may be thoroughly and evenly breaded and may be individually frozen and packed in frozen condition in containers without freezing together.

A further object of this invention is to provide an improved pin bar and rack structure which will permit initial sizing or grading of the seafood so that the seafood passing through the subsequent steps will not be wasted.

A further object of this invention is to provide apparatus which can be easily maintained in sanitary condition.

A further object of this invention is to provide apparatus of this kind which will speed up the handling of the seafood in the initial and subsequent steps involved in preparing the seafood for consumption.

With the above and other objects in view, our invention consists in the arrangement, combination and details of construction disclosed in the drawings and specification, and then more particularly pointed out in the appended claims.

In the drawings:

Figure 1 is a plan view partly broken away of a pinning apparatus for use in preparing seafood for quick freezing.

Figure 2 is a longitudinal section taken substantially through the center of the apparatus.

Figure 3 is a sectional view taken on the line 3—3 of Figure 1.

Figure 4 is a fragmentary sectional view taken on the line 4—4 of Figure 1.

Figure 5 is a fragmentary sectional view taken on the line 5—5 of Figure 4.

Figure 6 is a fragmentary sectional view taken on the line 6—6 of Figure 4.

Figure 7 is a fragmentary side elevation of one of the pinning bars.

Figure 8 is a sectional view taken on the line 8—8 of Figure 7 showing an article mounted on the pinning bar.

Figure 9 is a fragmentary sectional view taken on the line 9—9 of Figure 8.

Referring to the drawings, the numeral 10 designates generally a frame structure which is formed of opposite side members generally designated as 11 and 12. The side members 11 and 12 are formed of upright end bars 13 and 14 and an intermediate bar 15. A lower longitudinal bar 16 is connected between the end bars 13 and 14 and the intermediate bar 15.

A plurality of transverse lower connecting bars 17 are connected between the lower bars 16 adjacent the opposite ends thereof and an intermediate connecting bar 18 is connected between the longitudinal bars 16. A pair of upper connecting bars 19 and 20 are secured between the upright end members 13 and 14 at a point substantially below the upper ends thereof and an intermediate upper connecting bar 21 is also secured between the intermediate uprights 15.

A guide rail 22 is secured to the inner side of each side member. An upper guide rail 23 of angle shape is secured to the upper ends of the uprights 13 and 14 and intermediate upright 15 in parallel relation to the intermediate rail 22. A pair of outwardly projecting pan supporting angle bars 24 are secured to the uprights 14 and 15, and a partitioned pan or tray generally designated as 25 is adapted to engage on the rails or guides 24. The guides 24 are connected together at their outer ends by means of a connecting bar 26 and are also braced by means of upwardly and outwardly inclined bracing bars 27.

The tray 25 is formed of front and rear walls 28 and 29, respectively, and opposite end walls 30. A longitudinal partition 31 is secured between the end walls 30 and to a bottom wall 32. The partition or divider 31 is formed with one or more drain openings 33 and the rear wall 29 is also formed with one or more drain openings 34. The articles such as shrimp or the like which are to be pinned to the pinning strips as will be hereinafter described are adapted to be initially positioned in the forward compartment 35 formed between the front wall 28 and the partition wall 31. The shrimp or other articles which are discarded and are not to be pinned to the pinning bars are placed in the rear compartment 36. The pan supporting rails 24 have secured thereto upright channel members 37 which are disposed outwardly from the adjacent uprights 14 and 15.

Each channel member 37 has secured to the inner side thereof a U-shaped pin bar supporting member 38 which is formed in the inner wall 39 thereof with a slot 40. The pin bar supporting members 38 are inclined to the vertical being inclined inwardly and downwardly as shown in Figures 3 and 4. A pin bar generally designated as 41 is adapted to engage in the slots 40 of the supporting members 38 and the pin bar 41 is formed of an elongated flat metal strip which is provided at the opposite ends thereof with a cutout or rabbet 42 so that the upper edge of the pin bar 41 will be flush with the upper edge of the supporting member 48 and with the upper edge of the bar frame or rack as will be hereinafter described.

A plurality of article supporting pins 43 are carried by each pin bar 41 and project angularly upwardly and outwardly and are adapted to pierce an article 44 as shown in Figure 8. The pins 43 are secured to the bar 41 by forming slots 45 projecting upwardly from the lower edge of the bar 41 and forming the upper end of each slot 45 on an angle as indicated at 46. The slot 45 is then constricted by compressing the bar 41 so that the pin 43 will be tightly wedged within the slot 45.

The pins 44 are adapted to be substantially vertical when the pin bar 41 is disposed in the supporting member 38 as shown in Figure 3 so as to facilitate the placing of the articles 44 on the pins. After each pin bar 41 has been filled with articles 44, the pin bar is disposed in a rectangular frame or rack generally designated as 47. The rack 47 is formed of longitudinal channel members 48 which are connected together at the opposite ends thereof by angle members 49.

The channel members 48 are formed with spaced slots 50 within which the adjacent ends of the pin bars 41 are adapted to engage and the upper edge of each pin bar 41 is disposed flush with the upper edges of the channel members 48. In practice as shown in Figure 3 the frame structure 10 is provided with two pan supporting members on the opposite sides thereof which are disposed in confronting position so that two persons may work on the opposite sides of the frame, and the filled pin bars are placed by each person within the rack or frame 47 after the manner shown in Figure 3. After one frame or rack 47 is filled with pin bars the filled rack is moved to the left as viewed in Figure 2 so that an empty rack or frame 47 may be placed between the operators disposed adjacent the pans 25.

A pair of drain pans 51 and 52 are adapted to engage on the rails 22 with one pan beneath the rack 47 which is being filled and the other pan 52 being disposed beneath the filled rack which is moved to the opposite end of the frame 10.

In the use and operation of this apparatus the shrimp or other articles which are to be frozen are placed in compartment 35, and a pin bar 41 is suspended between the confronting supporting members 38. The articles 44 such as shrimp or the like which are in initially refrigerated condition are mounted on the vertically disposed pins 43, and the smaller or undesirable shrimp are sorted out during the pinning operation and placed in the rear compartment 36. When a pin bar 41 has been filled with shrimp the bar 41 is inserted in slots 50 of rack or frame 47.

The suspended shrimp as set forth in our copending application supra are then coated with batter and meal and placed in a quick freezer where the shrimp or articles 44 are solidly frozen.

The apparatus hereinbefore described provides a means whereby the shrimp will be individually suspended and spaced one from the other so that during the subsequent steps leading to the solid freezing of the articles, the articles will not freeze together.

What is claimed is:

1. In combination a suspension assembly and supporting frame therefor, a pair of horizontal guide rails carried by said frame, a pair of outwardly projecting inclined supporting rails carried by said frame below said guide rails, a tray on said supporting rails, a pair of vertical posts fixed to said supporting rails outwardly of said frame, a U-shaped holder on each post having the outer side thereof fixed to the inner side of said post, the inner side of said holder having a slot extending downwardly from the upper edge thereof, a flat pin bar bridging the space between said U-shaped supporting members and removably engaging in said slots, each bar having spaced slots in the lower edge thereof, the upper end of said latter named slots being inclined to the vertical, and pins wedgingly engaging in said latter named slots, said bar being distorted on opposite sides of the slots therein whereby to tightly hold the pins therein, said supporting members being inclined to the vertical whereby said pins will be vertically disposed.

2. In combination a suspension assembly and supporting frame therefor, a pair of horizontal guide rails carried by said frame, a pair of outwardly projecting inclined supporting rails carried by said frame below said guide rails, a tray on said supporting rails, a pair of vertical posts fixed to said supporting rails outwardly of said frame, a U-shaped holder on each post having the outer side thereof fixed to the inner side of said post, the inner side of said holder having a slot extending downwardly from the upper edge thereof, a flat pin bar bridging the space between said U-shaped supporting members and removably engaging in said slots, each bar having spaced slots in the lower edge thereof, the upper end of said latter named slots being inclined to the vertical, pins wedgingly engaging in said latter named slots, said bar being distorted on opposite sides of the slots therein whereby to tightly hold the pins therein, said supporting members being inclined to the vertical whereby said pins will be vertically disposed, and a rectangular rack engaging said guide rails, said rack including channel shaped end bars having vertical slots in the inner wall thereof within which said pin bars are adapted to engage.

References Cited in the file of this patent

UNITED STATES PATENTS

| Number | Name | Date |
|---|---|---|
| 354,208 | O'Sullivan | Dec. 14, 1886 |
| 415,399 | Snow | Nov. 19, 1889 |
| 449,469 | Ellington | Mar. 31, 1891 |
| 551,403 | Proctor | Dec. 17, 1895 |
| 680,965 | Distelhurst | Aug. 20, 1901 |
| 942,694 | Winton | Dec. 7, 1909 |
| 1,294,946 | Pupilla | Feb. 18, 1919 |
| 1,456,295 | Bain | May 22, 1923 |
| 1,461,946 | Sievert | July 17, 1923 |
| 1,622,855 | Warner | Mar. 29, 1927 |